United States Patent [19]

Heideman

[11] Patent Number: 4,810,849

[45] Date of Patent: Mar. 7, 1989

[54] WELD GUN CONTROL

[75] Inventor: Robert J. Heideman, Westland, Mich.

[73] Assignee: Enertrols, Inc., Westland, Mich.

[21] Appl. No.: 37,864

[22] Filed: Apr. 13, 1987

Related U.S. Application Data

[63] Continuation-in-part of Ser. No. 5,682, Jan. 21, 1987.

[51] Int. Cl.[4] .................... B23K 11/10; F16F 9/00
[52] U.S. Cl. ........................... 219/89; 219/90; 188/314; 188/285
[58] Field of Search .............. 219/89, 90, 86.1, 78.01; 188/313-316, 318, 285

[56] References Cited

U.S. PATENT DOCUMENTS

| 2,035,954 | 3/1936 | Focht | 188/314 |
| 2,240,644 | 5/1941 | Focht | 188/315 |
| 4,139,182 | 2/1979 | Nagase et al. | 188/318 X |
| 4,450,131 | 7/1984 | Challenger | 219/89 |

FOREIGN PATENT DOCUMENTS

| 1962543 | 7/1970 | Fed. Rep. of Germany | 219/90 |
| 78170 | 12/1970 | German Democratic Rep. | 219/90 |
| 52-30947 | 8/1977 | Japan | 219/90 |
| 0001072 | 1/1984 | Japan | 219/89 |
| 584009 | 12/1977 | U.S.S.R. | 219/89 |

Primary Examiner—E. A. Goldberg
Assistant Examiner—Catherine M. Sigda
Attorney, Agent, or Firm—Krass & Young

[57] ABSTRACT

A weld gun assembly including a support structure; a pair of arm members pivotally mounted intermediate their ends on the support structure on a common pivot axis; a weld tip at one end of each arm members; an air cylinder interconnected between the other ends of the arm members and operative when actuated to move the weld tips together in a closing direction; and a pair of hydraulic control devices extending respectively between the support structure and one arm member and between the support structure and the other arm member. The control devices function to ensure that the weld tips arrive at their closed welding position adjacent the panels to be welded at the same time irrespective of unbalancing forces acting on the weld gun and further function to ensure that there are no unbalancing forces tending to move the closed tips away from their closed positions.

20 Claims, 3 Drawing Sheets

FIG. 4

WELD GUN CONTROL

REFERENCE TO RELATED APPLICATION

This application is a continuation-in-part of U.S. patent application Ser. No. 005,682, filed on Jan. 21, 1987.

BACKGROUND OF THE INVENTION

This invention relates to weld guns and more particularly to a control device for a weld gun.

Weld guns are commonly used in industry to weld panels or the like together. In a typical weld gun installation, a pair of arms are pivotally mounted intermediate their ends on a support member, a weld tip is provided at one end of each arm, and a power device such as an air cylinder is positioned between the other ends of the arms. In operation, after the panels or the like to be welded have been positioned between the spaced welding tips, the power device is actuated to move the weld tips in a closing direction and into contact with opposite faces of the panels, the weld tips are electrically energized to accomplish the resistance welding operation, and the power device is actuated in the opposite sense to move the weld tips apart.

Whereas these prior art weld guns have been generally satisfactory, there are situations in which the weld tips damage the finish of the members being welded. Specifically, whereas the arms of the gun in their open position are typically stabilized by positive stops, as the arms move away from the stops and move toward their closed position, they are subject to unbalancing forces. As a result, one weld tip often engages the members to be welded before the other tip and the engaged tip thereafter absorbs the reaction force generated by the continued opening movement of the power cylinder. As the engaged tip becomes the reaction point for the final closing movement of the other tip, it digs into the surface of the member to be welded and leaves a dimple in the surface, or in severe cases, badly deforms the member and/or dislodges the member from the associated fixture. Further, even if the tips arrive at the desired welding location at the same time, the unbalancing forces inherent in the weld gun act to exert a force on the tips tending to move them, in unison, away from the position at which they closed, further tending to damage the panels. In some situations the damage resulting from these unbalancing forces is tolerable but in many situations, for example when welding cosmetic panels such as exterior automobile panels, this damage is not tolerable and requires that the automobile be pulled off of the assembly line and moved to a special repair area where the damage is repaired in an expensive and time consuming operation.

SUMMARY OF THE INVENTION

This invention is directed to the provision of a weld gun which consistently performs the welding operation without damaging the surfaces of the members being welded.

More specifically, this invention is directed to the provision of a weld gun in which the closing movement of the weld tips is carefully and precisely controlled to ensure that both the tips engage the members to be welded at the same time and to further ensure that there are no unbalancing forces acting on the weld tip following their arrival at their welding positions.

In the invention weld gun assembly, an adjustable hydraulic control assembly is provided to provide precise control of the tip closing movement.

According to a feature of the invention, the hydraulic assembly includes a pair of hydraulic control devices each arranged to extend between a respective arm member of the weld gun and a portion of the support structure for the weld gun. The control devices function to positively control the speed of closing movement of each tip to ensure that the tips engage the members to be welded at the same time irrespective of unbalancing forces acting on the individual arms and further function to ensure that there are no unbalancing forces acting on the tips following their arrival at their welding locations.

According to a further feature of the invention, the arm members are pivotally mounted intermediate their ends on the support structure on a common axis, the weld tips are provided on the ends of the arm members at one side of the axis, the power means extend between the ends of the arm members at the other side of the axis, the support frame includes a frame portion positioned at the power means side of the axis and between the arm members, and the hydraulic control devices extend respectively between the frame portion and a respective arm member. This arrangement provides a compact package, provides precise and individual control of the closing movement of the weld tips, and allows easy retrofit of the invention control devices to existing weld gun assemblies.

According to a further feature of the invention, each of the control devices includes means to adjust the rate of flow of hydraulic fluid therein so as to respectively control the speed of closing movement of the respective tips and at least one of the control devices includes pressure control means operative to preclude flow of fluid therein below a predetermined fluid pressure level therein. This arrangement allows the flow rate means in the control devices to be individually adjusted to ensure that the tips arrive at the desired welding location at the same time and allows the pressure control means of the one control device to be set at a value to preclude movement of the tips away from their welding location following their arrival at their welding location.

According to a further feature of the invention, the one control device further includes means to selectively vary the fluid pressure level below which the flow is precluded in that device. This arrangement allows the predetermined pressure level within the one device to be selectively set to effectively counteract the unbalancing forces acting on the weld gun and thereby preclude movement of the weld tips away from their welding position following their arrival at their welding position.

According to a further feature of the invention, each of the control devices includes a cylinder closed at one end; a piston assembly including a piston positioned within the cylinder and a piston rod projecting out of the other end of the cylinder; means defining a closed loop hydraulic fluid path within the cylinder; and valving means operative to vary the rate of flow of hydraulic fluid in the closed loop path and further operative to preclude flow of hydraulic fluid in the closed loop path below a predetermined fluid pressure level within the cylinder.

According to a further feature of the invention, the valving means includes a first valve member positioned at a first point in the closed loop hydraulic fluid path and adjustably movable to vary the cross sectional area of the path at this point, and a second valve member positioned at a second point in the closed loop path and movable in response to the predetermined fluid pressure level in the cylinder from a first position closing the path at the second point to a second position opening the path. This feature provides a compact and convenient arrangement for readily controlling the flow rate of the fluid in the closed loop path and readily controlling the pressure of the fluid in the closed loop path.

According to a further feature of the invention, the fluid moves in the closed loop path in response to outward extension of the piston rod relative to the cylinder; the device further includes a bearing member positioned in one end of the cylinder and including a central axial bore slidably receiving the piston rod; the closed loop path includes passage means in the bearing member; and the first and second valve members are positioned in the passage means. This arrangement provides a compact and efficient package for providing the desired flow control and load control within the cylinder.

According to a further feature of the invention, the passage means in the bearing member includes an axial valving bore in the bearing member communicating with and forming a radial enlargement of the central axial bore; a first transverse valving bore opening at its outer end adjacent a rate access port in the cylinder, extending transversely into the bearing member, and tangentially intersecting the axial valving bore; a second transverse valving bore opening at its outer end adjacent a load access port in the cylinder, extending transversely into the bearing member, and communicating at its inner end with the inner end of the first valving member; and an axial passage extending from the second transverse bore to the interior of the cylinder. The first valve member is movable axially in the first transverse bore by a suitable tool inserted through the rate access port to adjustably vary the effective cross section of the first transverse bore; the second valve member is positioned in a second transverse bore and blocks a second transverse bore in the first closed position of the second valve member; and the device further includes a spring loading device positioned in the second transverse bore, biasing the second valve member to its first closed position, and movable axially in the second transverse bore by a suitable tool inserted through the load access port to vary the predetermined fluid pressure level at which the second valve member moves to its second, open position. This arrangement provides a convenient means of readily adjusting the rate at which fluid flows through the device as well as the pressure at which the fluid flows through the device.

According to a further feature of the invention, the device further includes an inner tube extending from the bearing member to the closed end of the cylinder and defining an annular chamber with the cylinder; the axial passage in the bearing member opens in this annular chamber; the piston is slidably received in the inner tube; port means are provided in the inner tube adjacent the closed end of the cylinder; and the closed loop path includes the interior chamber of the inner tube, the axial valving bore, the first transverse valving bore, the second transverse valving bore, the axial passage, and the port means. This arrangement provides a compact and efficient fluid path through the control device to provide effective control for the movement of the arms of the weld gun, and is amenable to ready control of the rate of flow of fluid therethrough and the pressure at which the fluid flows therethrough.

According to a further feature of the invention, further passage means are provided in the bearing member extending between the annular chamber and the interior chamber of the inner tube, and check valve means are provided in association with these further passage means to allow ready flow of hydraulic fluid from the annular chamber to the interior chamber of the inner tube wall but to preclude fluid flow from the interior chamber of the inner tube to the annular chamber. This arrangement provides a compact and efficient means of allowing the cylinder assembly to readily retract in response to actuation of the power means in a sense to open the weld tips while further providing a separate closed loop path to adjustably control the closing movement of the weld tips.

DETAILED DESCRIPTION OF THE PREFERRED EMBODIMENT

Figures 1, 2:
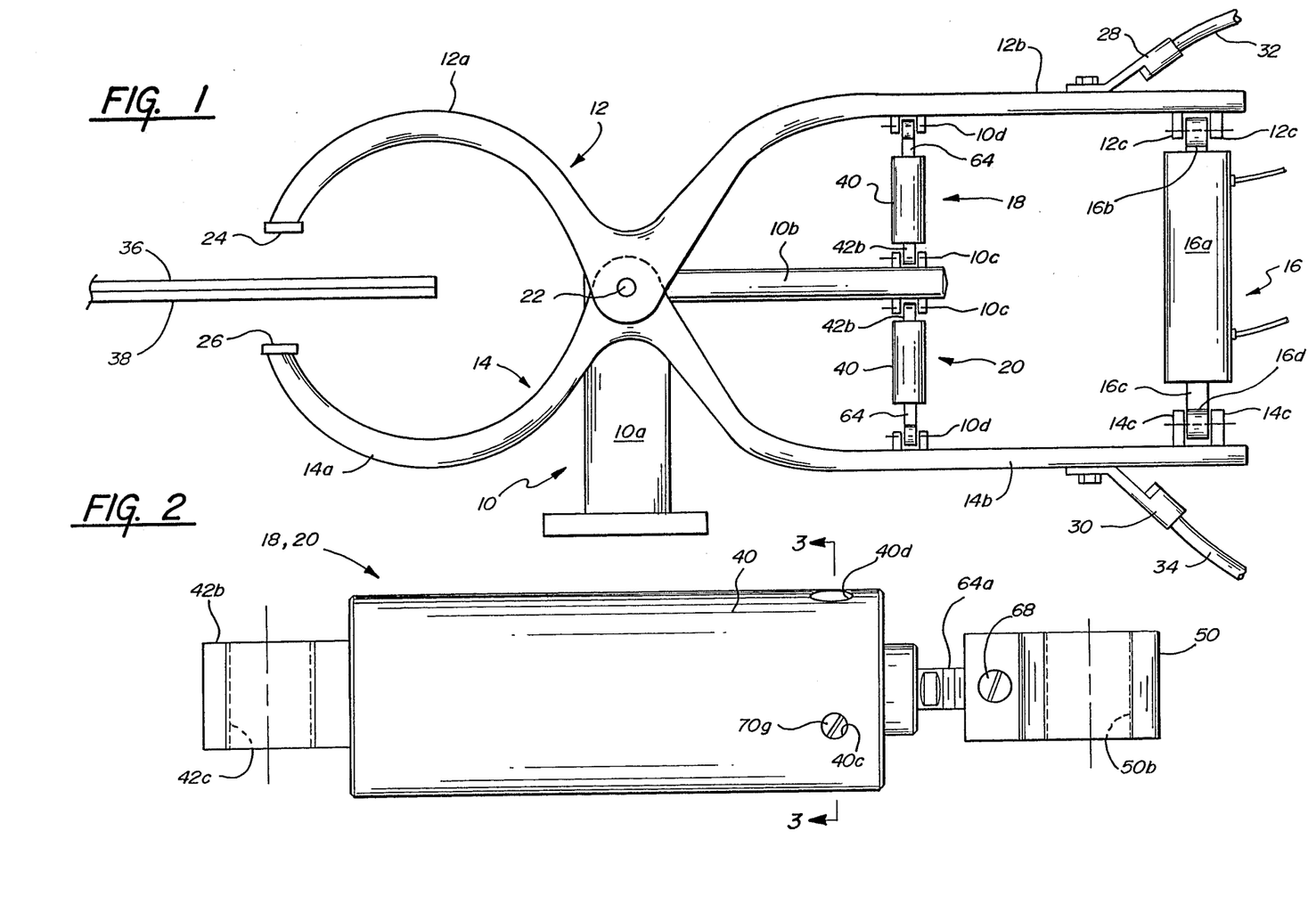
FIG. 1 is a somewhat schematic view of the invention weld gun assembly.
FIG. 2 is a view of a hydraulic control device employed in the weld gun assembly of FIG. 1.

The weld gun assembly as seen in FIG. 1, broadly considered, includes a support structure 10; a pair of arm members 12 and 14; a power member 16; and a pair of hydraulic control devices 18 and 20.

Support structure 10 includes a pedestal portion 10a and an arm portion 10b extending generally at right angles with respect to the upper end of pedestal portion 10a. It will be understood that support structure 10 may comprise a fixedly mounted structure or may be secured to a suitable robotic assembly so as to be movable by the robotic assembly between a plurality of welding locations.

Arm members 12 and 14 are pivotally mounted intermediate their ends to the upper end of support structure pedestal portion 10a by a pivot pin 22 and each include a forward or jaw portion 12a, 14a and a rearward or handle portion 12b, 14b. Weld tips 24,26 are respectively suitably secured to the free ends of arm member jaw portions 12a and 14a. It will be seen that arm members 12 and 14 operate in the manner of pincers with opening movement of handle portions 12b, 14b, producing closing movement of jaw portions 12a, 14a and closing movement of handle portions 12b, 14b producing opening movement of jaw portions 12a, 14a. Electrical power is provided to arm members 12, 14 and thereby to weld tips 24,26 by terminals 28,30 suitably secured to handle portions 12b, 14b and suitably crimped to electrical cables 32 and 34. It will be understood that arm members 12,14 are suitably insulated from each other, from support structure 10, from power member 16, and from hydraulic control devices 18 and 20 so that the electrical power delivered by cables 32,34 is transferred directly to weld tips 24,26 to accomplish the resistance welding operation of members such as panels 36,38 suitably inserted between the opened weld tips.

Power member 16 may take any of several known forms but preferably includes a double acting air cylinder assembly of known construction. The cylinder 16a of air cylinder assembly 16 is pivotally secured to the outer or free end of arm member handle portion 12b by a clevis 16b pivotally coacting with lugs 12c on arm member handle portion 12b. The lower end of piston rod 16c of the air cylinder assembly is pivotally mounted to the outer or free end of arm member handle portion 14b by a clevis 16d pivotally coacting with lugs 14c on arm member handle portion 14b. It will be understood that actuation of cylinder assembly 16 in an expanding sense operates to move handle portions 12b, 14b apart and move weld tips 24,26 together and that contracting actuation of assembly 16 moves arm member handle portions 12b, 14b together and moves weld tips 24, 26 apart.

Hydraulic control devices 18 and 20 are identical and extend respectively between support structure arm portion 10b and arm member handle portion 12b and between support structure arm portion 10b and arm member handle portion 14b.

Each hydraulic control device 18,20 includes an outer tube or cylinder 40; an inner retainer and clevis 42; a bearing member 44; an inner tube 46, a piston assembly 48, and a clevis 50.

Cylinder 40 is of standard tubular form and includes an annular groove 40a adjacent the rearward or closed end of the cylinder; an annular groove 40b adjacent the forward or open end of the cylinder, and a circular port 40c adjacent the open or forward end of the cylinder.

Inner retainer and clevis 42 includes a plug portion 42a sealingly positioned in the rear end of the cylinder 40 and precluded against outward movement relative to the cylinder by a snap ring 52 received in annular groove 40a, and a clevis portion 42b defining a central aperture 42c for suitable receipt of a clevis pin carried by lugs 10c on support structure arm portion 10a.

Bearing member 44 is sealingly positioned in the open or forward end of cylinder 40 and precluded against outward movement relative to the cylinder by a snap ring 54 received in annular groove 40b. Bearing member 44 includes a hub portion 44a at its forward end housing a wiper seal 56 and a reduced diameter portion 44b at its rearward end defining an annular chamber 58 with the adjacent surface of cylinder 40.

Inner tube 46 is positioned within outer tube or cylinder 40 in spaced relation to cylinder 40 to define an annular chamber 60 therebetween. The rearward end of inner tube 46 is fixedly mounted on a hub portion 42d of member 42 and the forward end of inner tube 46 is sealingly positioned within an annular groove 44c in the rear face of bearing member reduced diameter portion 44b. Annular chamber 60 thus extends from member 42 to bearing member reduced diameter portion 44b where it communicates with annular chamber 58. A plurality of circumferentially spaced ports 46a in the rear end of inner tube 46 provide communication between the interior chamber 62 of inner tube 46 and annular chamber 60.

Piston assembly 48 includes a piston rod 64 and a piston head 66. Piston rod 64 extends slidably through a central through bore 44d in bearing member 44 and includes a forward threaded end portion 64a and a rearward threaded end portion 64b. Piston head 66 includes a threaded central bore 66a for threaded receipt of the threaded rearward end portion 64b of piston rod 64 and includes a reduced diameter button portion 66b at its rearward end for abutting coaction with member 42 in the bottomed out condition of the device. Button portion 66b also serves to space the main body portion 66c of the piston head from the end of the cylinder in the bottomed out condition of the device so as to avoid covering of ports 46a by piston head main body portion 66c.

Clevis 50 includes a threaded central bore 50a for threaded receipt of threaded end portion 64a of piston rod 64 and a central aperture 50b for suitable receipt of a clevis pin carried by lugs 10d on arm members 12,14. A set screw 68 allows the selective adjustment of the threaded position of piston rod threaded portion 64a in clevis threaded bore 50a so as to selectively vary the effective overall length of the control device.

Bearing member 44 is selectively configured to provide an adjustable high pressure fluid passage therethrough and a separate low pressure fluid passage therethrough.

The high pressure fluid passage through the bearing member is provided by an axial bore 44e forming a radial enlargement of central bore 44d and extending from the rear end of the bearing member, where it communicates with interior volume 62, to an intermediate location within the bearing member; a first transverse bore 44f extending inwardly from the outer face of the bearing member; a second transverse bore 44g extending inwardly from the outer face of the bearing member and communicating at its lower or inner end with the lower or inner end of bore 44f; and a passage 44h extending axially rearwardly in the bearing member from the inner or lower end of bore 44g to annular chamber 58.

Transverse bore 44f includes an upper threaded portion 44i, a main body portion 44j and a reduced diameter inner or lower end portion 44k. Main body portion 44j communicates tangentially with axial bore 44e and the lower or inner end of reduced diameter bore portion 44k communicates with the lower end of bore 44g.

Transverse bore 44g includes an upper smooth bore portion 44l, a main body portion 44m, and a reduced diameter inner or lower end portion 44n communicating with the lower end 44k of transverse bore 44f.

Passage 44h communicates with bore 44g adjacent the conical shoulder 44p formed at the intersection of main body portion 44m and reduced diameter portion 44n. Bores 44e, 44f, 44g and 44h thus coact to define a high pressure fluid passage through the bearing member extending from interior volume 62 to annular chamber 58. The rate of fluid flow through this high pressure passage is selectively varied by a needle valve member 70 adjustably positioned in transverse bore 44f and the pressure of the fluid in this passage is controlled by a pressure valve assembly 72 positioned in transverse bore 44g.

Figures 3, 5, 6, 7:
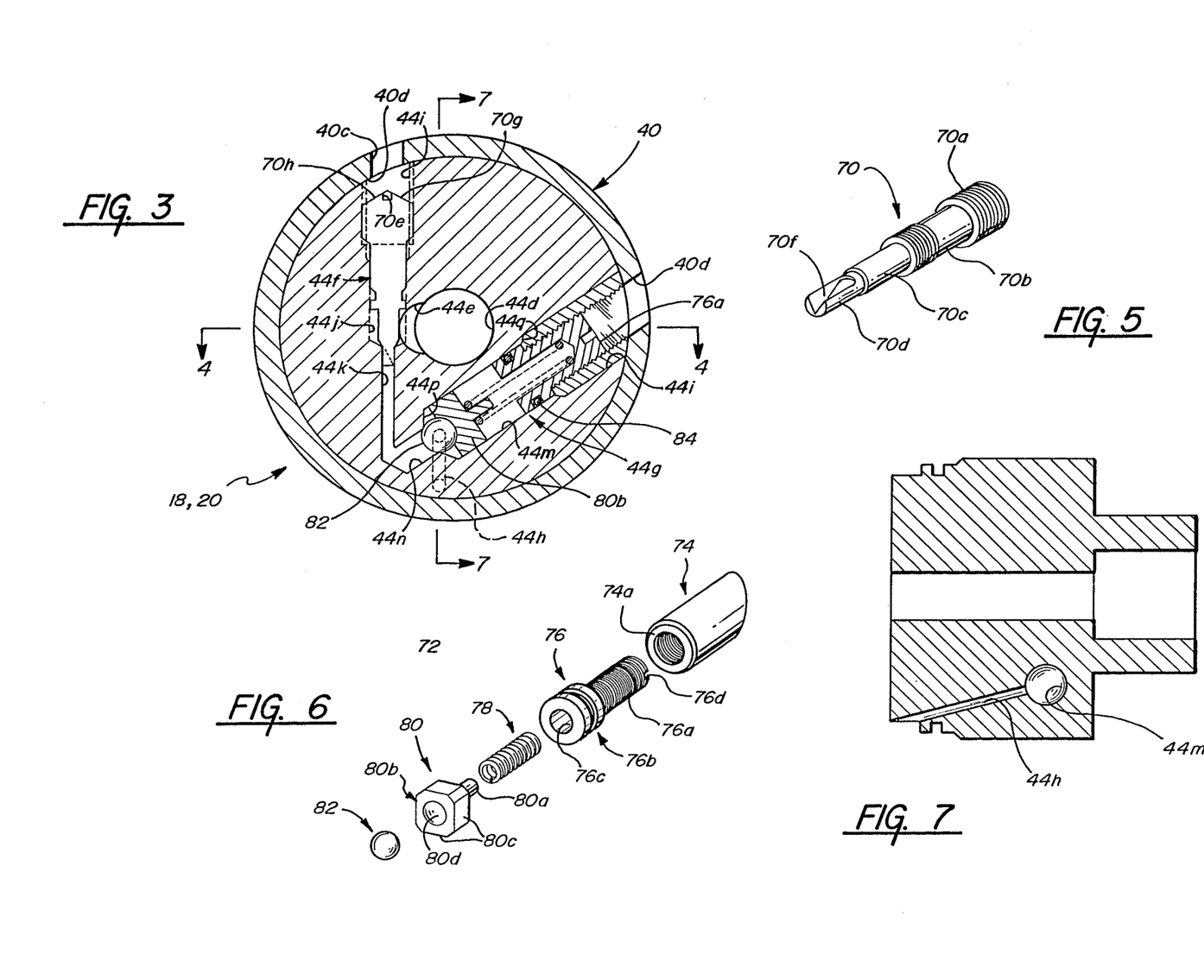
FIG. 3 is a cross sectional view taken on line 3—3 of FIG. 2.
FIG. 5 is a perspective view of a flow control valve member employed in the invention hydraulic control device.
FIG. 6 is a perspective exploded view of a pressure control valve assembly employed in the invention hydraulic control device.
FIG. 7 is a cross sectional view taken on line 7—7 of FIG. 4.
Figure 4:
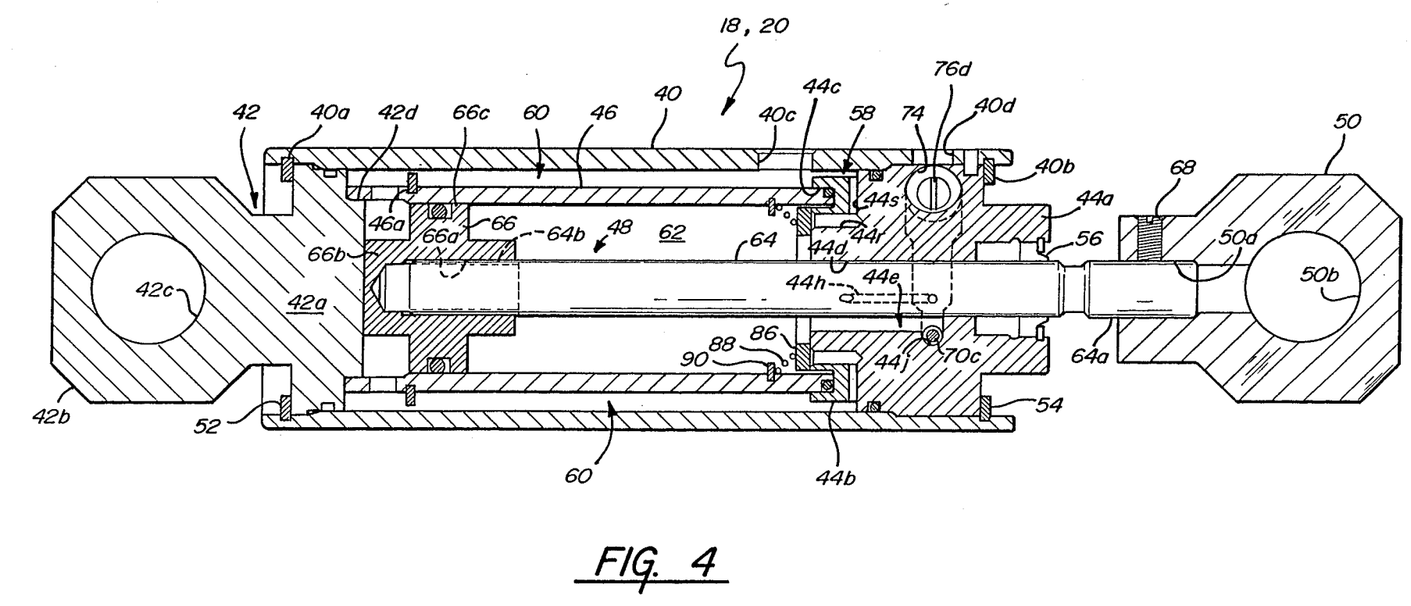
FIG. 4 is a cross sectional view taken on line 4—4 of FIG. 3.

Valve member 70 includes a threaded upper or outer end portion 70a, a main body portion 70b, and a valving portion 70c including a valving tip 70d. Threaded portion 70a threadably coacts with threaded portion bore 44i; main body portion 70b is slidably and sealingly received in main body bore portion 44j; and valving portion 70c adjustably coacts with reduced diameter bore portion 44k to vary the effective cross sectional area of the high pressure passage. In the assembled relation of the parts, the upper or outer end of bore 44f is aligned with a rate access port 40c in cylinder 40 so that a screwdriver or other suitable tool may be inserted through port 40c for coaction with a slot 70e in the outer end of the valve member to selectively move the valve member axially within bore 44f and selectively vary the position of valve member valving portion 70d relative to reduced diameter bore portion 44k. The position of port 40c in FIG. 2 is displaced from its true position for purposes of clarity. Valving tip portion 70d includes a V-shaped groove 70f to provide a finer and more precise adjustment of the flow area provided through the high pressure passage in response to axial adjustment of valve member 70. The outer end 70g of valve member threaded portion 70a comprises an arcuate conical surface centered on the longitudinal center line of cylinder 40 so that surface 70g moves into conforming seating engagement with the adjacent inner surface 40d of cylinder 40 to define the outer limit of adjustable valve member movement in bore 44f.

Pressure valve assembly 72 includes an insert 74, a load control screw 76, a coil spring 78, a ball retainer 80, and a ball valve member 82.

Insert 74 is internally threaded and is press fitted into upper smooth bore portion 44l of transverse bore 44g with its lower or inner end 74a abutting against a conical shoulder 44q defined at the intersection of bore portions 44l and 44m.

Load control screw 76 is threadedly received at its upper reduced diameter threaded end portion 76a in insert 74 and includes a lower enlarged diameter sealing portion 76b defining an annular groove for receipt of a sealing O-ring 84.

Ball valve member 82 comprises a ball sized to fit in the seat defined by conical shoulder 44p at the intersection of bore portions 44m and 44n.

Ball retainer 80 includes an upper guide stem portion 80a and a lower main body portion 80b.

Main body portion 80b includes flats 80c to allow hydraulic fluid to flow therepast in bore 44m, and further includes a spherical, concave recess 80d at its lower or inner face sized to seat ball member 82.

Spring 78 is seated at its lower end on guide stem portion 80a of ball retainer 80 and is received at its upper end in a blind central bore 76c in load control screw 76. In the assembled relation of the parts, the upper or outer end of bore 44g is aligned with a load access port 40d in cylinder 40 so that a screwdriver or other suitable tool may be inserted through port 40d for coaction with a slot 76d in the outer end of load control screw 76 to selectively threadably move load control screw inwardly or outwardly and thereby selectively vary the spring loading on ball retainer 80 and selectively vary the predetermined hydraulic fluid pressure in bore portion 44n at which ball member 82 will move from its closed position blocking bore 44g to its open position allowing fluid flow from bore 44g into axial passage 44h.

A low pressure passage through the bearing member 44 is provided by a series of circumferentially spaced blind bores 44r extending forwardly from the rear face of bearing member reduced diameter portion 44b and a corresponding series of radial bores 44s extending between the blind ends of bores 44r and annular chamber 58. An annular ring 86 is positioned within chamber 62 in covering relation to the rearward openings of axial passages 44r. Ring 86 is maintained in sealing position with respect to bores 44r by a relatively weak coil spring 88 positioned within chamber 62 by a snap ring 90 received in an internal annular groove in inner tube 46. Annular ring 86 functions as a check valve to preclude passage of fluid from interior chamber 62 into bores 44r but to readily allow passage of fluid out of bores 44r into chamber 62.

It will be understood that in the assembled relation of each control device 18,20 an accumulator (not shown) of closed cell sponge material is positioned in annular chamber 60, and the total interior volume of the device is filled with a viscous hydraulic fluid.

In operation of the invention weld gun assembly, air cylinder 16 is selectively actuated to move weld tips 24 and 26 between their open and closed positions. The button portion 66b of the piston assembly of each control device moves into abutting coaction with the associated plug 42a to establish the respective open positions of tips 24, 26 and these open positions may be selectively varied by selective threaded adjustment of the respective clevis 50 along the respective piston rod threaded portion 64a. The movement of the tips from their open to their closed position in juxtaposition to panel members 36,38 is adjustively resisted by the high pressure passage in control devices 18 and 20 and the movement of the weld tips from their closed to their open or rest positions is readily allowed by the low pressure passage in control devices 18 and 20. Since there are unbalancing forces acting on arm members 12 and 14 as they move in a tip closing direction, it is necessary to individually adjust control devices 18 and 20 to selectively accommodate the differences in the various forces acting on the arm members 12 and 14. This selective adjustment is accomplished by selected threaded movement of flow control valve members 70 in transverse bores 44f to selectively vary the cross sectional area of each passage and thereby selectively adjust the flow rate in each passage to selectively vary the rate of closing movement of each weld tip to ensure that the weld tips will arrive at their welding position in juxtaposition to the panel members at the same time so as to avoid the prior art problem of one tip arriving before the other and the first tip to arrive thereafter becoming a reaction point for the further closing movement of the other tip with resultant dimpling of the surface engaged by the first tip to arrive.

Specifically, if it is desired to have the tips meet at a point midway between the open tip positions, one valve member 70 may be closed incrementally further than the other valve member to maintain equal flow through the two valve members irrespective of differences in the pressure of the fluid passing through the valve members because of the unbalance forces inherent in the weld gun. Further, if it is desired to increase or decrease the speed at which the tips move together, the valve members 70 may be opened or closed in unison. And further, if it is desired to have the weld tips meet at a welding location other than the midpoint between the open tip positions, valve members 70 may be selectively and individually adjusted so that the tips come controllably together at any location between the open tip positions above or below the midpoint location.

After the tip closing speeds have been selectively and individually adjusted to ensure that the tips arrive at the desired welding position at the same time, the tips will still have a tendency to move, in unison, away from their closed position due to the unbalancing forces inherent in the weld gun.

Specifically, if the weld gun assembly provides more weight at the right hand side of pivot axis 22 as viewed in FIG. 1, the weld gun will have a tendency to pivot as a unit in a clockwise direction about axis 22 and, conversely, if the weld gun assembly provides more weight at the left side of the pivot axis 22 the weld gun will have a tendency to pivot as a unit in a counterclockwise direction about axis 22.

If, as is typical, the gun has a tendency to move clockwise as viewed in FIG. 1, the pressure control valve assembly 72 of the lower control unit 20 is adjusted to provide a pressure setting for ball valve member 82 such that the valve member will not unseat when confronted with the pressure generated in bore portion 44n by the unbalancing forces in the weld gun so that flow through the high pressure passage of control device 20 is precluded and the weld tips will remain fixed in the desired closed position. The setting of the pressure valve assembly 72 of the upper control device 18 is not significant in this scenario since the unbalancing forces are tending to contract this device and thereby tending to create flow through the uncontrolled, low pressure passage of this device.

If the gun has a tendency to move counterclockwise, the pressure control valve assembly 72 of the upper device 18 is selectively adjusted to preclude flow through the high pressure passage of that device in response to the unbalancing forces tending to move the closed weld tips away from their closed positions.

It will be understood that air cylinder 16 moves the tip to their closed positions with a force that dwarfs the pressure settings of pressure control valve assemblies 72 so that the flow resistance imposed by assembly 72 is insignificant as compared to the forces generated in the control devices by the air cylinder. The settings of valve assembly 72 become critical only after the tips have moved together, at which time the pressure level in the control devices drops to 0, ignoring any pressures that may be generated by the unbalancing forces acting on the weld gun. That is, the pressure valve assemblies 72 play no significant role during the closing movement of the tips under the influence of the powerful air cylinder 16 but come into play only after the tips have assumed their closed positions.

The invention may be embodied as a complete weld gun assembly as seen in FIG. 1 or, alternatively, the invention may be carried out by retrofitting existing weld gun assemblies with control devices of the type disclosed by the invention. Whether embodied as a total weld gun assembly or as a retrofit to existing weld gun assemblies, the invention provides a ready and efficient means for selectively adjusting the individual movement of the arm members of the weld gun in a manner to enable the weld tips to arrive at the same time at any desired welding position, and further provides a means to ensure that there are no unbalancing forces acting on the tips following their arrival at their closed welding position.

Whereas a preferred embodiment to the invention has been illustrated and described in detail, it will be apparent that various changes may be made in the disclosed embodiment without departing from the scope or spirit of the invention.

I claim:

1. A weld gun assembly comprising:
   (A) a support structure;
   (B) a pair of arm members each having first and second ends and each pivotally mounted intermediate their ends on said support structure;
   (C) a weld tip at said first end of each arm member;
   (D) a power member interconnected between said second ends of said arm members and operative when actuated to move said weld tips together in a closing direction to a desired welding position; and
   (E) control means comprising an adjustable hydraulic cushioning apparatus operative to control the speed of closing movement of said arm members to ensure that said tips arrive at said desired welding position at the same time and further operative to maintain said tips at said welding position following their arrival at said welding position.

2. A weld gun assembly according to claim 1, wherein:
   (F) said cushioning apparatus comprises a pair of hydraulic control devices each arranged to extend between a respective arm member and a portion of said support structure.

3. A weld gun assembly according to claim 2 wherein:
   (G) said power means is a double acting air cylinder.

4. A weld gun assembly according to claim 2 wherein:
   (G) each of said control devices includes fluid passage means therein and means to individually adjust the rate of flow of hydraulic fluid in said fluid passage means thereof so as to respectively control the speed of closing movement of the respective arm members; and
   (H) at least one of said control devices includes means to preclude flow of fluid in said fluid passage means thereof below a predetermined fluid pressure level in said fluid passage means thereof.

5. A weld gun assembly according to claim 4 wherein:
   (I) said one control device further includes means to selectively vary said predetermined fluid pressure level.

6. A weld fun assembly comprising:
   (A) a support frame;
   (B) first and second arm members;
   (C) a weld tip at one end of each arm member;
   (D) means mounting said arm members on said support frame for movement between an open, rest position in which said weld tips are spaced to allow insertion of members to be welded therebetween and a closed, welding position in which said weld tips are juxtaposed to the inserted members;
   (E) power means extending between said arm members and operative when actuated to move said arm members between their open and closed positions; and
   (F) control means comprising an adjustable hydraulic cushioning apparatus engaging said arm members and operative to control the speed of movement of said arm members from their open to their closed positions and further operative, following arrival of said arm members at their closed position, to maintain said arm members in their closed position and thereby maintain said weld tips in their positions juxtaposed to the inserted members.

7. A weld gun assembly according to claim 6 wherein:
   (G) said cushioning apparatus comprises a first hydraulic control device extending between said support structure and said first arm member and a second hydraulic control device extending between said support structure and said second arm member.

8. A weld gun assembly according to claim 7 wherein:
(H) said arm members are each pivotally mounted intermediate their ends on said support structure on a common axis;
(I) said weld tips are on the ends of said arm members at one side of said axis;
(J) said power means extends between the ends of said arm members at the other side of said axis;
(K) said support frame includes a frame portion positioned at said other side of said axis between said arm members; and
(L) said first and second hydraulic control devices extend between said frame portion and said first and second arm members respectively.

9. A weld gun assembly according to claim 7 wherein:
(H) each of said control devices includes fluid passage means therein and means for selectively varying the rate of flow of hydraulic fluid in said fluid passage means thereof so as to selectively vary the speed of movement of the respective arm member; and
(I) at least one of said devices further includes means precluding hydraulic flow in said fluid passage means thereof below a predetermined fluid pressure level in said fluid passage means thereof.

10. A weld gun assembly according to claim 7
(H) each of said control devices includes
    (1) a cylinder closed at one end and filled with hydraulic fluid
    (2) a piston assembly including a piston positioned within said cylinder and a piston rod projecting out of the other end of said cylinder,
    (3) means defining a closed loop hydraulic fluid path within said cylinder, and
    (4) valving means operative to vary the rate of flow of hydraulic fluid in said closed loop path and further operative to preclude flow of hydraulic fluid in said closed loop path below a predetermined fluid pressure level within said cylinder.

11. A weld gun assembly according to claim 10 wherein said valving means includes:
(I) a flow control valve member positioned at a first point in said path and adjustably movable to vary the cross sectional area of said path at said first point; and
(J) a pressure control valve member positioned at a second point in said path and movable in response to said predetermined fluid pressure level from a first position closing said path at said second point to a second position opening said path.

12. A weld gun assembly according to claim 11 wherein:
(K) each control device further includes means for selectively varying said predetermined fluid pressure level.

13. A weld gun assembly according to claim 12 wherein, for each control device;
(L) said fluid moves in said closed loop path in response to outward extension of said piston rod relative to said cylinder;
(M) said device further includes a bearing member positioned in said other end of said cylinder and including a central axial bore slidably receiving said piston rod; and
(N) said closed loop path includes passage means in said bearing member and said valve members are positioned in said passage means.

14. A weld gun assembly according to claim 13 wherein, for each control device,
(O) a rate access port and a load access port are provided in said other end of said cylinder
(P) said passage means includes
    (1) an axial valving bore in said bearing member communicating with and forming a radial enlargement of said central bore,
    (2) a first transverse valving bore opening at one end thereof adjacent said rate access port in said cylinder, extending transversely into said bearing member, and tangentially intersection said axial valving bore,
    (3) a second transverse valving bore opening at one end thereof adjacent said load access port in said cylinder, extending transversely into said bearing member, and communicating at its inner end with the inner end of said first valving bore, and
    (4) an axial passage extending from said second transverse bore to the interior of said cylinder;
(Q) said flow control valve member is movable axially in said first transverse bore by a suitable tool inserted through said rate access port to adjustably vary the effective cross section of said first transverse bore;
(R) said pressure control valve member is positioned in said second transverse bore and blocks said second transverse bore in the first, closed position of said pressure control valve member; and
(S) said device further includes a spring loading device positioned in said second transverse bore, biasing said pressure control valve member to its first, closed position, and movable axially in said second transverse bore by a suitable tool inserted through said load access port to vary the predetermined fluid pressure level at which said pressure control valve member moves to its second, open position.

15. A weld gun assembly according to claim 14 wherein, for each control device;
(T) said device further includes an inner tube extending from said bearing member to said closed end of said cylinder and defining an annular chamber with said cylinder;
(U) said axial passage in said bearing member opens in said annular chamber;
(V) said piston is slidable received in said inner tube;
(W) port means are provided in said inner tube adjacent the closed end of said cylinder; and
(X) said closed loop path includes the interior chamber of said innertube, said axial valving bore, said first transverse valving bore, said axial passage, and said port means.

16. A weld gun assembly according to claim 15 wherein, for each control device;
(Y) a further closed loop hydraulic path is defined within said cylinder and includes said inner tube interior chamber, said port means, said annular chamber, and further passage means extending through said bearing member between said annular chamber and said interior chamber;

(Z) said fluid moves in a first direction in said further closed loop path in response to inward movement of said piston rod relative to said cylinder; and (AA) a check valve is provided in said further closed loop path and said check valve is operative to allow flow of fluid in said first direction through said further closed loop path in response to inward movement of said piston rod and to block flow of fluid in the opposite direction through said further closed loop path in response to outward movement of said piston rod.

17. A weld gun assembly according to claim 16 wherein, for each control device, said check valve is defined at the opening of said further passage means in said interior chamber and includes an annular member positioned in said interior chamber and spring biased into a position covering said opening of said further passage means in said interior chamber.

18. A hydraulic control device comprising:

(A) a cylinder closed at one end thereof and defining a rate access port and a load access port adjacent the other end thereof;

(B) a bearing member positioned in said other end of said cylinder and including a central axial throughbore;

(C) an inner tube positioned within said cylinder in spaced relation thereto and extending from said bearing member to said closed end of said cylinder to define an annular chamber with said cylinder;

(D) a piston assembly including a piston positioned slidably within said inner tube and a piston rod projecting out of the other end of said cylinder through said central bearing member throughbore;

(E) port means in said inner tube adjacent the closed end of said cylinder;

(F) an axial valving bore in said bearing member communicating with and forming a radial enlargement of said central throughbore;

(G) a first transverse valving bore in said bearing member and opening at one end thereof adjacent said rate access port in said cylinder, extending transversely into said bearing member, and tangentially intersecting said axial valving bore;

(H) a second transverse valving bore in said bearing member and opening at one end thereof adjacent said load access port in said cylinder, extending transversely into said bearing member, and communicating at its inner end with the inner end of said first transverse valving bore;

(I) an axial passage in said bearing member extending from said second transverse bore to said annular chamber;

(J) a flow control valve member movable axially in said first transverse valve bore by a suitable tool inserted through said rate access port to adjustably vary the effective cross section of said first transverse bore;

(K) a pressure control valve member positioned in said second transverse bore and movable between a first position closing said second transverse bore and second position opening said transverse bore; and (L) spring loading means positioned in said second transverse bore, biasing said pressure control member to its first closed position, and movable axially in said second transverse bore by a suitable tool inserted through said load access port to vary the fluid pressure level at which said pressure control member moves to its second, open position.

19. A hydraulic control device according to claim 18 wherein:

(M) said device further includes further passage means in said bearing member extending between said annular chamber and the interior chamber of said inner tube; and (N) a check valve is provided in said further passage means and said check valve is operative to allow flow of fluid through said passage means from said annular chamber to said interior chamber but to block the flow of fluid from said interior chamber to said annular chamber.

20. A hydraulic control device according to claim 19 wherein:

(O) said check valve is defined at the opening of said further passage means in said interior chamber and includes an annular member positioned in said interior chamber and spring biased into a position covering said opening of said further passage means in said interior chamber.

* * * * *